United States Patent [19]

Marschollek et al.

[11] 4,271,126
[45] Jun. 2, 1981

[54] FLUIDIZED BED REACTOR FOR WORKING UP CARBON COATED PARTICLES

[75] Inventors: Michael Marschollek, Duren; Wolfgang Simon, Flörsheim; Carl Walter, Hanau, all of Fed. Rep. of Germany

[73] Assignee: Nukem GmbH, Hanau, Fed. Rep. of Germany

[21] Appl. No.: 904,223

[22] Filed: May 9, 1978

[30] Foreign Application Priority Data

May 11, 1977 [DE] Fed. Rep. of Germany ....... 2721182

[51] Int. Cl.² ............................. B01J 6/00; C10B 1/00
[52] U.S. Cl. .................................................. 422/143
[58] Field of Search .................... 423/4; 422/143, 144, 422/159; 34/10, 57

[56] References Cited

U.S. PATENT DOCUMENTS

| 3,053,642 | 9/1962 | Huntley et al. | 422/143 |
| 3,424,564 | 1/1969 | Bildstein et al. | 423/4 |
| 3,714,323 | 1/1973 | Dolci et al. | 423/4 |
| 3,756,786 | 9/1973 | Tillessen et al. | 423/4 |
| 3,974,091 | 8/1976 | Parker et al. | 422/144 |
| 4,135,889 | 1/1979 | Mori | 422/143 |

FOREIGN PATENT DOCUMENTS

| 2029608 | 12/1971 | Fed. Rep. of Germany | 423/4 |
| 2428393 | 1/1975 | Fed. Rep. of Germany | 423/4 |
| 2731248 | 1/1978 | Fed. Rep. of Germany | 423/4 |

OTHER PUBLICATIONS

I & EC Process Design and Development, vol. 5, No. 1 (1/66) pp. 51–59, Reilly et al.

Primary Examiner—S. A. Cangialosi
Attorney, Agent, or Firm—Cushman, Darby & Cushman

[57] ABSTRACT

There is provided a fluidized bed reactor for working up carbon coated particles, particularly nuclear fuel particles or fertile material particles consisting essentially of a cylindrical portion connected to a conical portion, there being provided gas supply pipes, gas distribution space and gas distribution heads within the conical reactor lower portion, the gas distribution members being arranged in at least two superimposed planes and distributed symmetrically over the cross-section of the reactor.

7 Claims, 2 Drawing Figures

FLUIDIZED BED REACTOR FOR WORKING UP CARBON COATED PARTICLES

BACKGROUND OF THE INVENTION

The object of the present invention is the development of a fluidized bed reactor for the working up of carbon coated nuclear fuel and fertile material particles for nuclear reactors consisting essentially of a cylindrical portion and a conical portion with gas supply lines, gas distribution space and gas distribution heads.

In the nuclear art, there are used spherical particles as nuclear fuel or fertile material. These particles have a heavy metal containing nucleus of uranium and/or thorium compounds, e.g., uranium carbide or uranium oxide or thorium oxide or thorium carbide. This heavy metal nucleus for physical reactor reasons (among others) coated with carbon. In the working up, e.g., for return of these particles to production therefore the carbon coating must first be removed before the exposed heavy metal nucleus can again be worked up.

The removal of the carbon coating normally takes place by burning where the heavy metal nuclei freed from their coating are present with reduced diameter and with high density as "Combustion Residue" for further working up. In this connection, it is important for the further working up that the carbon coating be completely burned off. Above all, this can be attained by the use of known fluidized bed principles in fluidized bed reactors. The burning of the carbon layer thereby must take place from the view of nuclear criticality safety.

The use of fluidized bed reactors for chemical processes is generally known (e.g., Chemie-Anlagen und-Verfahren, February 1972, pages 51–53). Typical of these fluidized bed reactors is a lateral discharge of material or a discharge of material by means of overflow. There is also known the possibility of withdrawing the material through a pipe vertically through the blower bottom foreign to the discharge of material (J. Beranek et al, Grundlagen der Wirbelschichttechnik, page 198, Mainz 1975).

In comparison to the coated particles, the uncoated particles are specifically heavier and therethrough at a specific speed of flow out of the fluidized bed reaction corresponding to the advancing coating removal sediment vertically downward the burned off heavy metal nuclei can only be incompletely drawn off through lateral discharge of material of through the discharge by means of an overflow. This is disadvantageous, e.g., because of the criticality and the nuclear fuel balance. Even if the heavy metal nuclei are discharged by a pipe, a complete withdrawal is only attainable below the flow injuring construction of the blower bottom.

Therefore, it would be advantageous to use a fluidized bed reactor in which there is possible a downward discharge of burned off particles even at a reactor diameter greater than 800 mm and in which no material temperature can occur above 650° C. Such a reactor which fulfills these conditions has not been previously known.

Therefore, it was the problem of the present invention to construct a fluidized bed reactor for working up carbon coated particles, particularly nuclear fuel particles or fertile particles which permitted a downward discharge of burned off heavy metal particles even at large reactor diameters, so that practically the entire reactor content gradually can be drawn off without the flow ratios required to maintain the fluidized bed being negatively influenced and particles sintered together through too high material temperatures at the bottom of the reactor.

SUMMARY OF THE INVENTION

This problem was solved by using a fluidized bed reactor which consists essentially of an upper cylindrical portion and a lower conical portion with gas supply lines, gas distribution space and gas distribution heads wherein according to the invention in the conical lower portion of the reactor the gas distribution members are arranged in two or more superimposed planes and are distributed symmetrically over the cross-section of the reactor.

For this purpose, it is industrially significant to arrange up to six distributor planes superimposed. With several planes, the expense of construction in relation to a further improvement of the flow behavior in the reactor is too high. The gas distributor heads are so arranged in the individual planes that, seen from above they are uniformly distributed over the reactor cross-section.

With two planes, there are used as a minimum seven gas distributor heads, whereby three are placed in the lower plane and four in the upper plane. There has proven particularly advantageous a reactor in which in all there are arranged twenty-nine gas distributor heads in three planes wherein there are located four gas distributor heads in the lower plane, twelve in the second (or middle) plane and thirteen in the upper plane and wherein in the reactor diameter is 500 to 1000 mm. The range of diameters of the lower end of the conical portion is 100 to 250 mm.

An upper limit is set on the total number of gas distributor heads and in the individual planes only by the cross-section of the reactor and the space occupied by the individual distribution heads.

BRIEF DESCRIPTION OF THE DRAWINGS

The invention will be understood best in connection with the drawings which illustrate the fluidized bed reactor of the invention wherein.

DESCRIPTION OF THE PREFERRED EMBODIMENT

Figure 1:
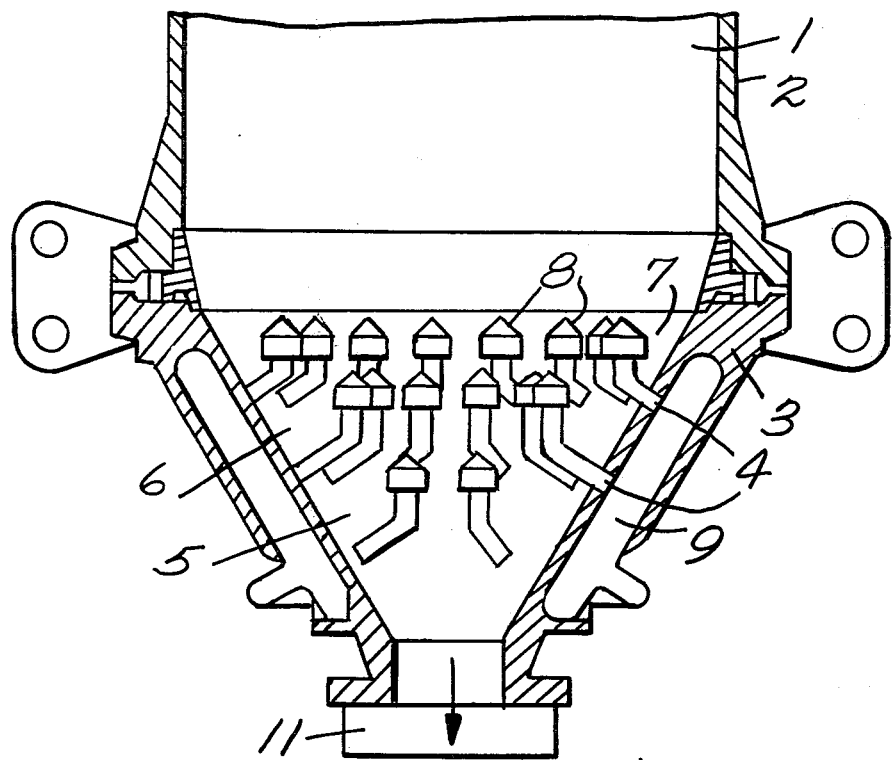
FIG. 1 shows schematically a longitudinal section.
Figure 2:
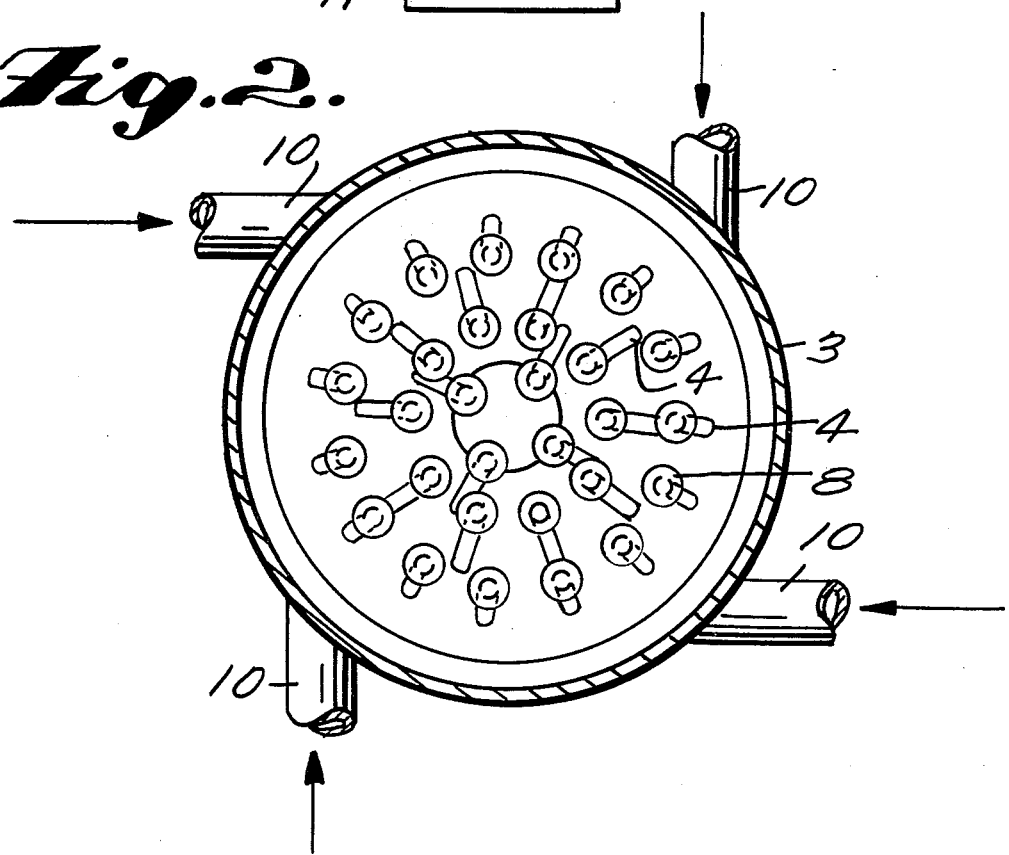
FIG. 2 shows schematically a cross-section of the reactor.

Referring more specifically to the drawings, the fluidized bed reactor 1 consists of an upper cylindrical portion 2 and a lower conical portion 3. The conical portion 3 is formed of a truncated cone which, for example, has a height of 380 mm as well as a surface diameter (upper) of 550 mm and a surface diameter (lower) of 120 mm. There project into this reactor lower portion 3 in this special case twenty-nine tubes or pipes 4 distributed on three planes, 5, 6 and 7. There are set upon the ends of the tubes 4 gas distributor heads 8.

There is located in the wall of the conical reactor lower portion the gas distribution space 9 from which the fluidizing or combustion gas is distributed to the twenty-nine pipes 4. The feeding of the fluidizing gas into the gas distribution space takes place for example by way of four gas supply pipes 10.

The amount of fluidizing and combustion gas mixture leaving the gas distributor heads 8 which normally consists of a mixture of carbon dioxide and oxygen has an operating volume throughput of about 700 m³/h. The gas velocity in the supply pipes 4 to the gas distribution heads 8 amounts to about 35 meters/sec. It is important through a directed distribution of the fluidizing gas the individual pipes 4 to attain a uniform distribution of the amount of fluidizing gas into the reactor lower portion 3. The gas velocity upon leaving the gas distributor heads 8 in the particle discharge is, e.g., 9 meters/sec.

It is advantageous with the fluidized bed reactor of the invention to have a gas volume throughput of 1000 to 4500 cubic meters per hour per square meter of reactor cross-section at a particle diameter of 0.3 to 5 mm, a particle weight of 0.005 to 5 grams and a charge degree of 10 to 25%. The combustion throughput then is 250 to 750 kg of carbon per hour.

In the operation of the reactor, the reactor lower portion 3 is filled with the heavy metal particles to be burned off, which for example have an average diameter of 400$\mu$ and a particle weight of 0.7 gram. This sedimented out particle charge can be varied with the reactor under consideration in regard to its charging volume on grounds of criticality within the range of 23 to 28 liters. Even at a charging volume of 23 liters it is still guaranteed that no gas distributor heads 8 project beyond the upper surface of the charge but they are located completely within the charge.

With the presently suggested reactor geometry, the number 29 for the gas distributor positions has proven favorable because thereby the fluidizing and combustion gas are uniformly distributed in the entire charge. Besides also the least distance of the gas distributor heads 8 or the pipes 4 from each other is so large that in the withdrawal of particles no bridges build between particles and their discharge downwardly made difficult.

With entrance into the particle charge, the fluidizing gas at the gas distributor head undergoes a high impulse loss through the deflection. Therethrough and through the connected flowing through of the particle charge with the impingement of the gas stream on the surface of the particles in the charge there is produced a homogeneous flow profile which is very important for a disturbance free operation of the fluidized bed reactor of the invention. Besides by this means there is attained an excellent cooling effect which avoids the inadmissibly high material temperatures of above 650° C.

The withdrawal of the heavy metal particles takes place by means of a floodgate 11 which is connected on the lower base of the conical reactor lower part 3. By a turning of the floodgate chamber, for example, there are drawn off about 0.5 liter of particle. These withdrawals means a certain sinking in of the charge surface in the center of the charge, however, without the charge surface of the burned off particles sinking below the upper limit of the upper gas distributor heads. The drawing off of the burned off particles only needs to take place in such amount that the charge surface does not sink below the upper plane 7 of the gas distributor heads. After the discharge of burned off particles, there is always added such an amount of unburned off particles to the reactor that there is maintained a uniform height of the fluidized bed.

The amounts of fluidizing or combustion gas supplied to the lower plane 5 contributes little to the formation of the fluidized bed but leads first of all to a complete burning of the graphite particles which were not yet burned in the fluidized bed. The downwardly reduced conical cross-section effects a still better picking up of the residual graphite particles for burning.

As fertile materials, there are employed for example carbon coated uranium (238) oxide, carbon coated uranium (238) carbide, carbon coated thorium (232) oxide and carbon coated thorium (232) carbide particles and as fissile materials there are employed for example carbon coated uranium (234) oxide, carbon coated uranium (234) carbide, carbon coated uranium (233) oxide, carbon coated uranium (233) carbide, carbon coated plutonium (239) oxide and carbon coated plutonium (239) carbide particles.

The process can comprise, consist essentially of or consist of the steps and materials set forth.

The combustion gas can be oxygen or air, for example, and the fluidizing gas can be carbon dioxide or argon for example.

EXAMPLE

The conformably invented reactor which is used for the combustion of graphite by the reprocessing of high-temperature fuel elements has the following structural dimensions:
reactor diameter 550 mm,
diameter of the conical end of the reactor 120 mm,
total height of the reactor ~4900 mm.
The reactor shell is equipped with fins which are led into circulating cooling shafts.
The base has 29 gas-distributing pipes.
The reactor is fed hourly with ground HTR-fuel elements of the following amount:

| 1. approx. | 110 kg | graphite $\rho \sim 1,2$ g/cm³ |
|---|---|---|
| 2. | 1 kg | UC₂-particles with SiC-layer $\Phi \sim 500$ $\mu$m, $\rho = 2,7$ g/cm³ weight 0,15 mg |
| 3. | 9 kg | ThO₂-particles $\Phi \sim 500$ $\mu$m, $\rho = 9,6$ g/cm³ weight 0,67 mg |

In detail these three positions consist of:
pure graphite particles
ThO₂-particles with residual graphite
UC₂-particles with amounts of graphite
The average diameter of the fed particles amounts to ~2 mm, the largest apparent diameter amounts to approximately 5–6 mm. Before operation the reactor is filled with ~23 l ThO-particles. This amount can be additionally submitted. It covers the base of the reactor and contributes to the improvement of the flow profile.

Subsequently, the actual loading of the three described components takes place.
The following are added as combustion and vortex gas:
O₂: 200 Nm³/h
CO₂: 50 Nm³/h
The gas velocity to the gas distributor heads amounts to 35 m/s, the velocity by the exhaust amounts to 9 m/s. The average gas velocity of 5 m/s in the reactor causes the heavy ThO₂ sink to the base of the flow after the combustion of the adherent graphite, while the light UC₂-particles are kept in vortex layer.

The combustion in the reactor takes place by ~1,6 bar. The resulting heat and the amount of heat to be eliminated amounts to 3 250 000 KJ/h in the exemplary construction.

| | |
|---|---|
| Temperature of combustion: approx. | 800° C. |
| Waste-gas composition: | 336 Nm/h $CO_2$—CO with graphite dust remains. |

At the base of the reactor batches of ~9 kg $ThO_2$ free from graphite are hourly drawn off.

Thus a constant enrichment of $UC_2$-particles takes place in the vortex bed. After 48 hours the coating is interrupted, the supply of vortex gas is stopped so that the 48 kg $UC_2$-particles free from graphite which have accumulated in the vortex space, sink and can be drawn off.

What is claimed is:

1. A fluidized bed reactor for processing carbon coated particles, such as nuclear fuel or fertile material particles, comprising an upper cylindrical portion, a lower frustoconical portion attached to said cylindrical portion, said frustoconical portion including at least three levels of gas distributor heads on its interior with the lowermost level having at least four heads, the middle level having at least 12 heads, and the uppermost level having at least 13 heads, said frustoconical portion also having an exterior common gas distributor space with each head of each level connected to said common gas distributor space, and with said heads of each level being symmetrically located about the central axis of said frustoconical portion, said common gas distributor space having a plurality of spaced apart gas supply conduits attached thereto.

2. The reactor as claimed in claim 1 wherein said common gas distributor space surrounds the exterior of said frustoconical portion.

3. A fluidized bed reactor according to claim 1 wherein the frustoconical portion has a height of 380 mm, the upper diameter of the frustoconical portion is 550 mm and the lower diameter of the frustoconical portion is 120 mm.

4. A fluidized bed reactor according to claim 1 having an upper diameter of the frustoconical portion of 500 to 1000 mm.

5. A process of burning off the carbon coating of carbon coated nuclear fuel particles or carbon coated fissile particles comprising charging said coated particles to the reactor of claim 1 to an extent sufficiently to cover all of the gas distribution heads supplying fluidizing gas and combustion gas to said gas distribution heads in an amount sufficient to fluidize the coated particles and burn off the carbon coating and discharging the burned off particles below the level of the lowest plane of gas distributor heads.

6. The process of claim 5 wherein the fluidized bed reactor has a gas volume throughput of 1000 to 4500 cubic meters per hour per square meter maximum reactor cross-section, the particle size of the carbon coated particles is 0.3 to 5 mm and the weight of the carbon coated particles is 0.005 to 5 grams.

7. The process of claim 6 wherein the fluidizing gas is carbon dioxide and the combustion gas is oxygen.

* * * * *